T. WEAVER,

Assignor to THE ANDERSON MANUFACTURING CO.

CARRIAGE SEAT.

No. 10,195. Reissued Sept. 12, 1882.

WITNESSES

E. H. Bates.

John W. Anderson.

INVENTOR

Theophilus Weaver, per Se.

Attorney

N. PETERS, Photo-Lithographer, Washington, D. C.

UNITED STATES PATENT OFFICE.

THEOPHILUS WEAVER, OF HARRISBURG, ASSIGNOR TO THE ANDERSON MANUFACTURING COMPANY, OF LANCASTER, PENNSYLVANIA.

CARRIAGE-SEAT.

SPECIFICATION forming part of Reissued Letters Patent No. 10,195, dated September 12, 1882.

Original No. 248,818, dated October 25, 1881. Application for reissue filed April 11, 1882.

248818

*To all whom it may concern:*

Be it known that I, THEOPHILUS WEAVER, of Harrisburg, county of Dauphin, and State of Pennsylvania, have invented new and useful Carriage Jump-Seats and Attachments, of which the following is a specification.

My invention relates to vehicles which may be adjusted from a single to a two seated conveyance, and vice versa. Its main novel and useful features are, first, peculiarly-pivoted lay-down front-seat frames, each composed of two uprights and three transverse bars, of which latter the top or seat-attaching bar is hinged to the middle bar, and regulates the set and releasement of the uprights by simply lifting and lowering the rear end thereof—that is, by raising and lowering the rear edge of the seat-board mounted thereon; second, certain extensions and projections on said upper transverse bars to better regulate the set and releasement of said uprights; third, a jump-seat frame of four parts pivoted together without stops about their pivotal points, its movements being limited solely by the tread of the riser-form front brace at relievable studs thereon, and which brace has its parts arranged to be frontward from the angle or tread thereof for admitting the retired front seat of any length in front of and under the same; fourth, certain horizontal side sections of a close-carriage body supplemental to the stationary low sides thereof, and a certain shifting rear panel with special hinge-connections, all supported as adjuncts of the rear jump-seat and operated by it. I attain these results by mechanism illustrated in the accompanying drawings, in which—

Figure 1:
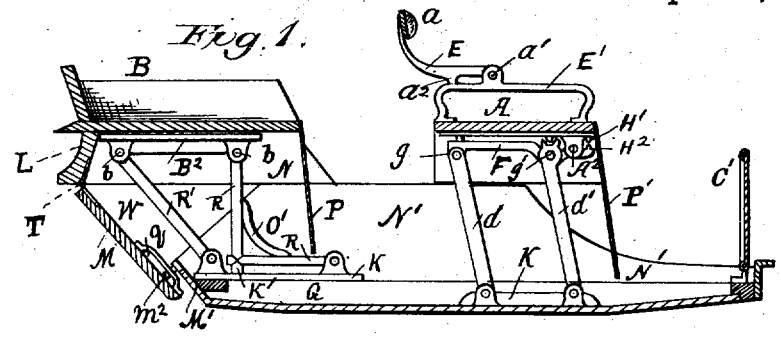
Figure 2:
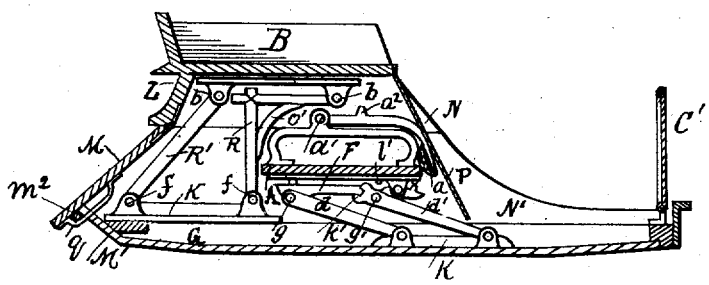
Figure 3:
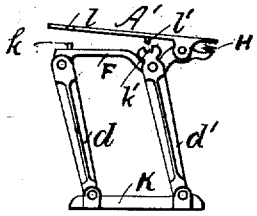
Figure 4:
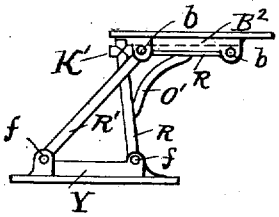
Figure 5:
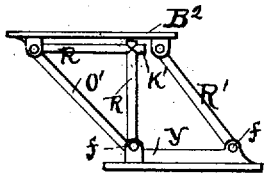
Figure 6:
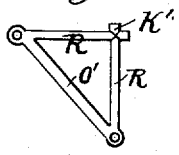
Figure 8:
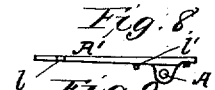
Figure 9:
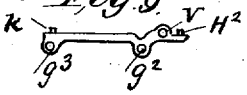
Figure 7:
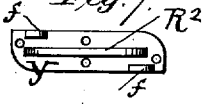

Figure 1 is a longitudinal section of my improved carriage adjusted as a two-seated vehicle with my improved jump-seats and lazy-back in position for occupancy. Fig. 2 is a like view of the same with seats adjusted as a single-seated carriage. Fig. 3 represents a view of my front-seat-supporting frame unlatched for laying down. Figs. 8 and 9 are details of the last named. Fig. 4 represents my rear-seat-supporting frame with front leg retreated and offset to pass the other leg or brace. Fig. 5 represents a view of my rear-seat suppporting-frame modified with a two-way diagonal erect brace offsetted relative to the other support. Figs. 6 and 7 are details of the last named.

Similar letters refer to similar parts in the views, referring to which for description—

Letter A represents the front seat; B, the rear seat.

A′ represents the hinged top bar of the front-seat-supporting frame, to which the seat-board is attached.

$A^2$ represents the hinge-joint, at which bar A′ is jointed to bar F, which latter is fulcrumed at *g g′* to the uprights *d d′*, as shown. Said uprights are pivoted to the foot-bar K. The upright *d′* extends beyond the transverse bar F, and has on its upper end a double strike and jaw, *k′*, and bar A′ has a tenon or bit, *l′*, to engage said jaw squarely when the seat is set. It holds the seat set both ways, and it is released by raising the rear edge of seat or bar A′, as shown in Fig. 3. The upper end of support *d′* may be made the tenon, and the bar A′ may have a corresponding jaw or mortise in or on it for its reception. The upright *d* ends at bar F; but it may also be extended beyond it, and its end entered like upright *d′*. The bar F has formed on it a stud, *k*, to enter a mortise, *l*, in bar A′, when the latter is down to its place, to keep the parts superimposed, and to resist lateral strain. The lift of bar A′ is limited by the ends H′ and $H^2$ coming in contact with each other. A spiral spring inserted between the ends of the bars A′ and F and retained at seats H′ $H^2$ acts, as does the weight of the occupant of the seat, to keep the parts hitched and braced. This seat-supporting frame may be laid down both ways. Its upper bars, A′ and F, are shown detached in Figs. 8 and 9, respectively.

In Figs. 1 and 2 are shown my rear-seat-supporting frames, with novel form and arrangement of only the front brace, O′ R, it having a tread or heel, K′, on which, as hereinafter explained, the seat is evenly supported both ways. The parts R are similar and arranged at right angles with each other, to be alternately a vertical brace under the seat. The object of this form of said front brace is not only to afford stiff bracing with little weight of metal, but also to stand out of the way under the seat when it is jumped forward to admit the front seat of any length desired to be laid down or folded thereunder, as shown in Fig. 2. The attaching-bars $B^2$ and K and the brace R′ are made in the usual form. When it is desired to have said front brace still more retreated it may be modified, as shown in Fig. 4, having its tread K′ to the rear of the brace R′. The braces are then off-setted from each other, the attaching plate or bar being made as shown in Fig. 7. Sometimes the regular and more elegant brace shown in Fig. 5 is used. Its triangular form is shown in Fig. 6. The extensions or heels at K′ of the front brace are so made that the throw of the seat may be varied by filing a part off the same, thus readily truing up the work of setting the seat-irons in carriages, where inequalities in the sills must sometimes be compensated for by corresponding depression of the seat-supports.

The side of the carriage-body shown in Figs. 1 and 2 is longitudinally divided into the stationary part N′ and the extensible part N, the latter being combined with the rear seat proper as a skirting thereof. The back of the carriage-body is also divided on the same horizontal plane as its sides, it having the part L fixedly joined as an attachment to said seat, as shown, and having the panel M hinged to part L above and hinged at its lower margin to the fixed base M′ by the sliding hinges $q\,m^2$. The adjustment of the said attached parts N and L and panel M is automatic and dependent on the movement of the rear seat. The hinge $q\,m^2$ is simply a set of guides or clips, $q$, in which fixed studs $m^2$ traverse back and forth as the panel is moved by the jump-seat B. The connected parts M M′ are made rattle-proof by rubber facings applied between them.

The lazy-back on my front seat, A, is composed of the folding arms E, having back $a$ thereon, and of the handles E′. Said arms are provided with the rests $a^2$, distinct from the hinge $a'$. The object of this improvement is to avoid the more expensive and less acceptable stop-hinge joint usually on lazy-backs, which are liable to catch clothing and hands in handling the same.

The projections or studs on the brace R are so made, as shown, that they may not only be readily dressed down to vary the set of the seat-frame, as described, but also that springs may be arranged between the upper one and the attaching-bar $B^2$ to relieve the set of the parts on each other.

Having described my invention sufficiently to indicate its nature and construction, I claim—

1. Carriage-seat-supporting frames, each composed of two upright braces or legs, $d\ d'$, and two transverse bars, F K, pivoted and fulcrumed together to form a freely-shifting lay-down parallelogram, with an added transverse bar or seat-attaching arm, A′, hinged to bar F and applied to hold in erected position the said legs and release the same, substantially as set forth.

2. In the seat-supporting frames $d\ d'$ A′ F K, with parts constructed and combined as set forth, the extensions H′ $H^2$, or their equivalents, on the hinged parts A′ and F, for limiting the lift of the seat in adjusting it, as set forth.

3. In each of the self-sustained shifting frames for supporting the rear seat, B, of a carriage, the combination of two attaching-plates, $B^2$ K, and two braces, R R′, pivoted together equidistantly, of which brace R is squarely retreated rearward at its middle, riser form, presenting a perpendicular brace between said plates at both positions of said seat and permitting the front seat, A, of any length desired, to be retired under the rear seat when it is adjusted, substantially as shown and described.

4. In the self-sustained jump-seat frame $B^2$ K R R′, whose riser-form brace R limits the movement thereof both ways, in combination with said brace the extensions K′, all constructed and arranged substantially as and for the purpose set forth.

5. In a carriage, the front seat, A, of length about equal to the interior cross-section of the carriage-body, and mounted adjustably on self-sustained lay-down frames, in combination with the rear jump-seat, B, supported on two self-sustained shifting-frames, $B^2$ K, R R′, having their front supports or braces, R, squarely retreated rearward at their middle to admit said front seat, A, of full length in front of and under them, when the seats are adjusted for a single-seated vehicle, substantially as set forth.

6. The rear seat, B, of the carriage, supported solely on self-sustained frames $B^2$ K R R′, independent of the sides of the carriage-body, in combination with skirtings N and shifting panel M, attached to said seat, for closing the carriage-body when the seats are adjusted to form a single-seated conveyance, substantially as shown and described.

7. The panel attachment M, hinged to the back of jump-seat B, and connected extensibly by clips $q$ thereon to the fixed part M′ by studs $m^2$ thereon, to compensate for the eccentric movement of said jump-seat in relation to the lower edge of said panel, substantially as and for the purpose set forth.

In testimony that I claim the foregoing as my invention I have hereunto set my hand and seal this 7th day of April, 1882, in presence of two witnesses.

THEOPHILUS WEAVER. [L. S.]

Attest:

JOHN W. ANDERSON,
PETER STRICKER.